US012322904B2

(12) United States Patent
Bucher et al.

(10) Patent No.: US 12,322,904 B2
(45) Date of Patent: Jun. 3, 2025

(54) RECEPTACLE ASSEMBLY HAVING A MODULE ORIENTATION FEATURE FOR PLUGGABLE MODULE

(71) Applicant: TE Connectivity Solutions GmbH, Schaffhausen (CH)

(72) Inventors: Alan Weir Bucher, Manheim, PA (US); Nitish Balakrishnan, Harrisburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 447 days.

(21) Appl. No.: 17/831,888

(22) Filed: Jun. 3, 2022

(65) Prior Publication Data

US 2023/0396023 A1 Dec. 7, 2023

(51) Int. Cl.
*H01R 13/64* (2006.01)
*H01R 13/659* (2011.01)

(52) U.S. Cl.
CPC ........... *H01R 13/64* (2013.01); *H01R 13/659* (2013.01)

(58) Field of Classification Search
CPC .. H01R 13/61; H01R 13/659; H05K 7/20418; H05K 7/2049
USPC ........................................................... 439/374
See application file for complete search history.

(56) References Cited

U.S. PATENT DOCUMENTS 7,764,504 B2 7/2010 Phillips et al.
8,535,096 B1 * 9/2013 Shirk .................... H01R 13/648 439/607.21
8,599,559 B1 * 12/2013 Morrison ............. H05K 9/0058 361/702
9,518,785 B2 12/2016 Szczesny
9,547,140 B2 1/2017 Wu et al.
9,547,141 B2 1/2017 Wu et al.
9,668,378 B2 5/2017 Phillips
11,089,716 B2 * 8/2021 Hall, III ............... H05K 7/2049
2008/0285236 A1 * 11/2008 Phillips ................ H01R 13/659 361/709
2013/0077254 A1 * 3/2013 Nguyen ............. H05K 7/20154 29/428
2013/0164970 A1 * 6/2013 Regnier ............... H01R 13/533 165/185

(Continued)

FOREIGN PATENT DOCUMENTS

CN 108493647 A * 9/2018 ........... G02B 6/4269
CN 208209055 U * 12/2018 ........... G02B 6/4269

(Continued)

*Primary Examiner* — Peter G Leigh

(57) ABSTRACT

A receptacle assembly includes a receptacle cage including cage walls forming a cavity. The cage walls include a top wall, a first side wall, and a second side wall. The receptacle cage extending between a front and a rear. The cavity includes a module channel configured to receive a pluggable module. The receptacle assembly includes a thermal transport assembly coupled to the receptacle cage. The thermal transport assembly includes a thermal bridge is received in the cavity. The thermal bridge includes a thermal interface at a bottom of the thermal bridge configured to interface with the pluggable module and remove heat from the pluggable module. The thermal bridge includes an orientation tab extending from the bottom. The orientation tab defines a keying feature for keyed mating with the pluggable module to orient the pluggable module in the module channel.

20 Claims, 7 Drawing Sheets

(56) References Cited

U.S. PATENT DOCUMENTS

| | | | | |
|---|---|---|---|---|
| 2014/0153192 | A1* | 6/2014 | Neer | H05K 9/0058 361/704 |
| 2015/0029667 | A1* | 1/2015 | Szczesny | G02B 6/4261 361/700 |
| 2015/0087180 | A1* | 3/2015 | Wu | G02B 6/4269 439/485 |
| 2016/0062065 | A1* | 3/2016 | Wu | G02B 6/4277 385/89 |
| 2016/0093996 | A1* | 3/2016 | Phillips | H01R 24/60 439/487 |
| 2017/0054234 | A1* | 2/2017 | Kachlic | H01R 13/6583 |
| 2018/0199468 | A1* | 7/2018 | Hall, III | G02B 6/4246 |
| 2018/0248305 | A1* | 8/2018 | Regnier | H01R 13/533 |
| 2018/0337476 | A1* | 11/2018 | Guy Ritter | H05K 7/20336 |
| 2019/0116692 | A1* | 4/2019 | Little | H01R 13/502 |
| 2019/0239392 | A1* | 8/2019 | Hall, III | G02B 6/4246 |
| 2020/0015385 | A1* | 1/2020 | Bucher | H05K 5/0286 |
| 2020/0049912 | A1* | 2/2020 | Lu | G02B 6/4269 |
| 2021/0083435 | A1* | 3/2021 | Kumar | H01R 13/6581 |
| 2021/0307204 | A1* | 9/2021 | Lu | H05K 7/20418 |
| 2021/0372713 | A1* | 12/2021 | Graham | H01L 23/3672 |

FOREIGN PATENT DOCUMENTS

| | | | | |
|---|---|---|---|---|
| CN | 108987966 B | * | 3/2021 | H01R 12/712 |
| CN | 109672050 B | * | 8/2021 | G02B 6/4269 |

* cited by examiner

RECEPTACLE ASSEMBLY HAVING A MODULE ORIENTATION FEATURE FOR PLUGGABLE MODULE

BACKGROUND OF THE INVENTION

The subject matter herein relates generally to electrical connector assemblies.

It may be desirable to transfer thermal energy (or heat) away from designated components of a system or device. For example, electrical connectors may be used to transmit data and/or electrical power to and from different systems or devices. One type of electrical connector assembly uses pluggable modules received in a receptacle cage of a receptacle assembly. Proper orientation of the pluggable modules in the receptacle assembly is important to avoid damaging components of the pluggable module or the receptacle connector during mating. Some known receptacle assemblies include an orientation feature extending from one of the walls of the receptacle cage to interface with the pluggable module to ensure proper orientation of the pluggable module in the receptacle cage.

A common challenge that confronts developers of electrical systems is heat management. Thermal energy generated by internal electronics within a system can degrade performance or even damage components of the system. To remove the thermal energy, systems include a thermal component, such as a heat sink, which engages the heat source, absorbs the thermal energy from the heat source, and transfers the thermal energy away. There are typically space constraints that limit sizes of the thermal components, which limit the amount of heat dissipation within the system.

BRIEF DESCRIPTION OF THE INVENTION

In one embodiment, a receptacle assembly is provided and includes a receptacle cage including cage walls forming a cavity. The cage walls include a top wall, a first side wall, and a second side wall. The receptacle cage extends between a front and a rear. The cavity includes a module channel configured to receive a pluggable module. The receptacle assembly includes a thermal transport assembly coupled to the receptacle cage. The thermal transport assembly includes a thermal bridge received in the cavity. The thermal bridge includes a thermal interface at a bottom of the thermal bridge configured to interface with the pluggable module and remove heat from the pluggable module. The thermal bridge includes an orientation tab extending from the bottom. The orientation tab defines a keying feature for keyed mating with the pluggable module to orient the pluggable module in the module channel.

In a further embodiment, a receptacle assembly is provided and includes a receptacle cage including cage walls forming a cavity. The cage walls include a top wall, a first side wall, and a second side wall. The receptacle cage extends between a front and a rear. The receptacle cage includes a channel separator received in the cavity between the first and second side walls. The channel separator includes an upper separator wall and a lower separator wall with a separator chamber between the upper and lower separator walls. The channel separator separates the cavity into an upper module channel configured to receive an upper pluggable module and a lower module channel configured to receive a lower pluggable module. The top wall includes a top opening providing access to the upper module channel. The lower separator wall includes a lower opening providing access to the lower module channel. The receptacle assembly includes a thermal transport assembly coupled to the receptacle cage. The thermal transport assembly includes a first cooling module and a second cooling module. The first cooling module includes a first thermal bridge located in the top opening. The first thermal bridge includes a first thermal interface at a bottom of the first thermal bridge configured to interface with the upper pluggable module and remove heat from the upper pluggable module. The first thermal bridge includes a first orientation tab extending from the bottom of the first thermal bridge. The first orientation tab defines a first keying feature for keyed mating with the upper pluggable module to orient the upper pluggable module in the upper module channel. The second cooling module includes a second thermal bridge located in the lower opening. The second thermal bridge includes a second thermal interface at a bottom of the second thermal bridge configured to interface with the lower pluggable module and remove heat from the lower pluggable module. The second thermal bridge includes a second orientation tab extending from the bottom of the second thermal bridge. The second orientation tab defines a second keying feature for keyed mating with the lower pluggable module to orient the lower pluggable module in the lower module channel.

In a further embodiment, a thermal bridge for a receptacle assembly configured to remove heat from a pluggable module plugged into the receptacle assembly is provided and includes an upper bridge assembly including a plurality of upper plates arranged in an upper plate stack. Each upper plate having a front end and a rear end. Each upper plate having sides between the front end and the rear end. Each upper plate having an inner end and an outer end. The thermal bridge for a receptacle assembly includes a lower bridge assembly including a plurality of lower plates arranged in a lower plate stack. Each lower plate having a front end and a rear end. Each lower plate having sides between the front end and the rear end. Each lower plate having an inner end and an outer end. The outer ends of the lower plates configured to face and thermally couple to an electrical component. The sides of the lower plates facing the sides of the upper plates to thermally interface the lower plates with the upper plates. The thermal bridge for a receptacle assembly includes a spring element positioned between the upper bridge assembly and the lower bridge assembly. The spring element includes an upper spring member engaging the upper plates to bias the upper plates with an opening force generally away from the lower plates. The spring element includes a lower spring member engaging the lower plates to bias the lower plates with an opening force generally away from the upper plates. The plurality of lower plates include an orientation plate having an orientation tab extending from the outer end thereof. The orientation tab defines a keying feature for keyed mating with the pluggable module to orient the pluggable module in the receptacle assembly.

DETAILED DESCRIPTION OF THE INVENTION

Figure 1:
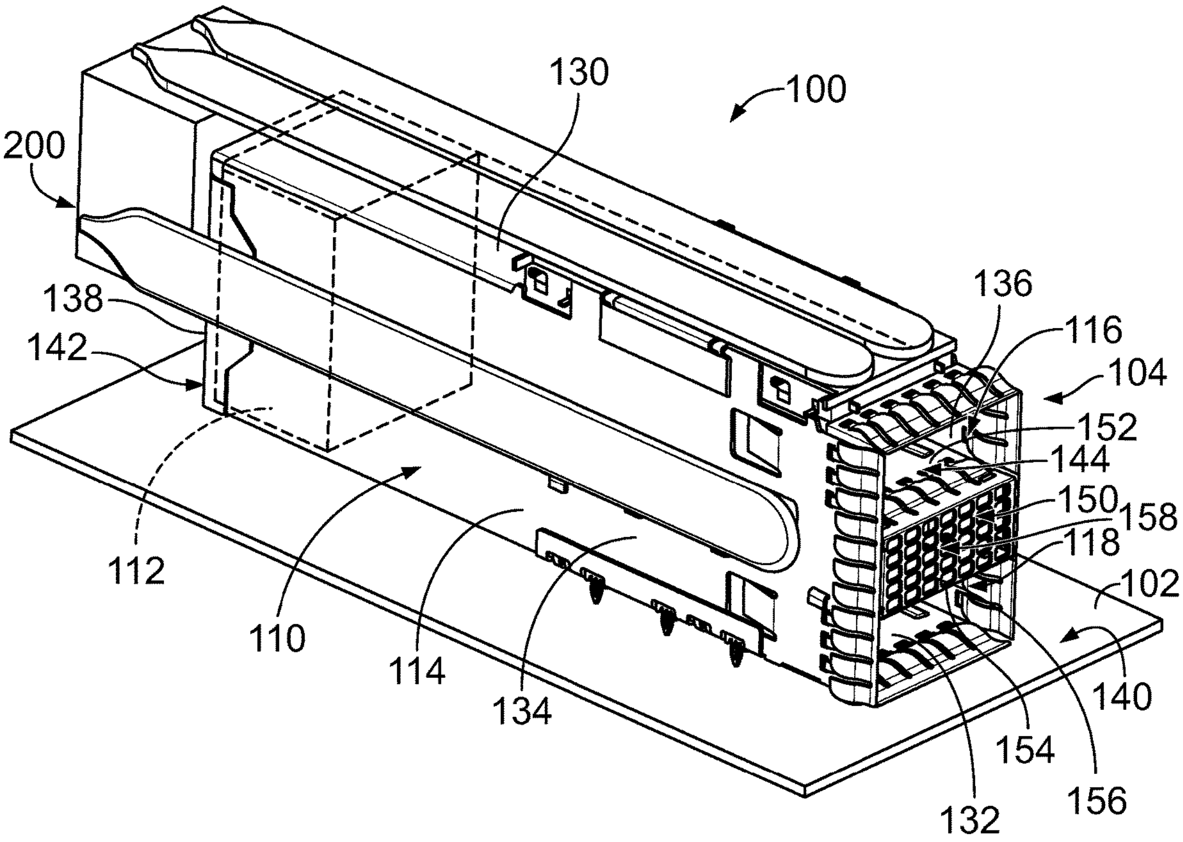
FIG. 1 is a front perspective view of an electrical connector assembly formed in accordance with an exemplary embodiment.

FIG. 1 is a front perspective view of an electrical connector assembly 100 formed in accordance with an exemplary embodiment. The electrical connector assembly 100 includes a host circuit board 102 and a receptacle assembly 104 mounted to the circuit board 102. In an exemplary embodiment, the receptacle assembly 104 includes a thermal transport assembly 200 used to remove heat from components of the electrical connector assembly 100.

The receptacle assembly 104 is configured to receive pluggable modules 106 (shown in FIG. 2), such as an upper pluggable module and a lower pluggable module. The pluggable modules 106 are electrically connected to the circuit board 102 through the receptacle assembly 104. However, in alternative embodiments, the pluggable modules 106 are electrically connected to cables through cable connectors rather than being electrically connected to the host circuit board 102. The thermal transport assembly 200 is used to remove heat from the pluggable modules 106 when plugged into the receptacle assembly 104.

In an exemplary embodiment, the receptacle assembly 104 includes a receptacle cage 110 and a communication connector 112 (shown in phantom) adjacent the receptacle cage 110. For example, in the illustrated embodiment, the communication connector 112 is received in the receptacle cage 110. In other various embodiments, the communication connector 112 may be located rearward of the receptacle cage 110. The communication connector 112 is electrically connected to the host circuit board 102. However, in alternative embodiments, the communication connector 112 may be a cable connector terminated to ends of cables rather than being terminated to the host circuit board 102.

In various embodiments, the receptacle cage 110 is enclosed and provides electrical shielding for the communication connector 112. The pluggable modules 106 are configured to be loaded into the receptacle cage 110 and surrounded by the receptacle cage 110. The receptacle cage 110 includes a plurality of cage walls 114 that define one or more module channels for receipt of corresponding pluggable modules 106. The cage walls 114 may be walls defined by solid sheets, perforated walls to allow airflow therethrough, walls with cutouts, such as for portions of the thermal transport assembly 200 to pass therethrough, or walls defined by rails or beams with relatively large openings, such as for airflow therethrough. In an exemplary embodiment, the receptacle cage 110 is a shielding, stamped and formed cage member with the cage walls 114 being shielding walls.

In the illustrated embodiment, the receptacle cage 110 constitutes a stacked cage member having an upper module channel 116 and a lower module channel 118. The receptacle assembly 104 is configured to mate with the pluggable modules 106 in both stacked module channels 116, 118. The receptacle cage 110 has module ports that open to the module channels 116, 118, respectively, which receive corresponding upper and lower pluggable modules 106. The thermal transport assembly 200 is configured to interface with both the upper and lower pluggable modules 106 to remove heat from the upper and lower pluggable modules 106. Any number of module channels may be provided in various embodiments. In the illustrated embodiment, the receptacle cage 110 includes the upper and lower module channels 116, 118 arranged in a single column; however, the receptacle cage 110 may include multiple columns of ganged module channels 116, 118 in alternative embodiments. Optionally, multiple communication connectors 112 may be arranged within the receptacle cage 110, such as when multiple columns of module channels 116 and/or 118 are provided. In other various embodiments, the receptacle cage 110 may include a single module channel 116 or a single row of module channels 116 rather than being a stacked receptacle cage.

In an exemplary embodiment, the cage walls 114 of the receptacle cage 110 include a top wall 130, a bottom wall 132, a first side wall 134, a second side wall 136, and a rear wall 138. The bottom wall 132 may rest on the host circuit board 102. However, in alternative embodiments, the receptacle cage 110 may be provided without the bottom wall 132. The receptacle cage 110 extends between a front end 140 and a rear end 142. The module ports are provided at the front end 140 and receive the pluggable modules 106 through the front end 140. Gaskets may be provided at the front end 140 surrounding the module ports to interface with the pluggable modules 106 when the pluggable modules 106 are plugged into the upper and lower module channels 116, 118.

The cage walls 114 define a cavity 144. For example, the cavity 144 may be defined by the top wall 130, the bottom wall 132, the side walls 134, 136 and the rear wall 138. The cage walls 114 provide shielding around the cavity 144. In an exemplary embodiment, the thermal transport assembly 200 is coupled to the cage walls 114, such as the top wall 130 and/or the first side wall 134 and/or the second side wall 136 and/or the rear wall 138.

In an exemplary embodiment, the receptacle cage 110 includes a port separator 150 received in the cavity 144. The port separator 150 separates or divides the cavity 144 into the upper and lower module channels 116, 118. The port separator 150 forms a space between the upper and lower module channels 116, 118, such as for receiving a portion of the thermal transport assembly 200. The port separator 150 includes an upper separator wall 152, a lower separator wall 154, and a front separator wall 156. The port separator 150 includes a separator chamber 158 between the upper and lower separator walls 152, 154. The separator chamber 158 is rearward of the front wall 156. The front separator wall 156 may include openings to allow airflow through the separator chamber 158. The separator chamber 158 is configured to receive a portion of the thermal transport assembly 200, such as for cooling the lower pluggable module 106 in the lower module channel 118.

The communication connector 112 is coupled to the circuit board 102. The receptacle cage 110 is mounted to the circuit board 102 over the communication connector 112. In an exemplary embodiment, the communication connector 112 is received in the cavity 144, such as proximate to the rear wall 138. However, in alternative embodiments, the communication connector 112 may be located behind the rear wall 138 exterior of the receptacle cage 110 and extend into the cavity 144 to interface with the pluggable module(s) 106. For example, the rear wall 138 may include an opening to receive components therethrough. In an exemplary embodiment, a single communication connector 112 is used to electrically connect with the pair of stacked pluggable modules 106 in the upper and lower module channels 116, 118. In alternative embodiments, the electrical connector assembly 100 may include discrete, stacked communication connectors 112 (for example, an upper communication connector and a lower communication connector) for mating with the corresponding pluggable modules 106.

In an exemplary embodiment, the pluggable modules 106 are loaded into the receptacle cage 110 through the front end 140 to mate with the communication connector 112. In an exemplary embodiment, the pluggable modules 106 are configured to be received in the corresponding module channels 116, 118 in a particular orientation. The receptacle assembly 104 includes keying features to ensure proper orientations of the pluggable modules 106. For example, the keying features restrict plugging the pluggable modules 106 into the module channels 116, 118 upside-down. In an exemplary embodiment, the orientation features are keys that fit in keyways formed in the pluggable modules 106. For example, the orientation features may be tabs, posts or other protrusions that fit in channels, slots or other openings formed in the pluggable modules 106. In an exemplary embodiment, the keying feature/orientation feature is part of the thermal transport assembly 200 and integrated with one of the heat transfer devices rather than being part of the receptacle cage 110

Figure 2:
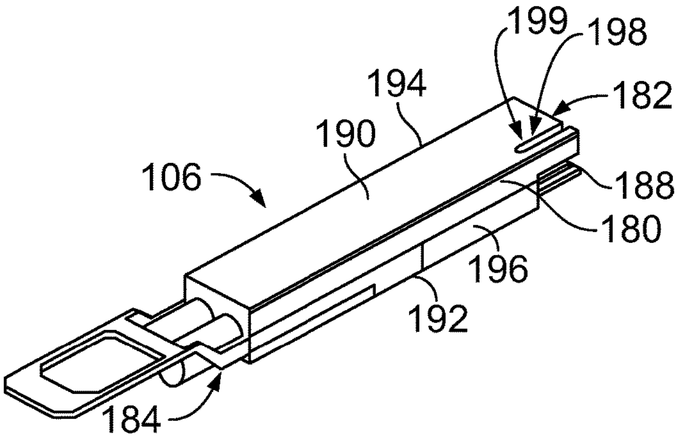
FIG. 2 is a rear perspective view of the pluggable module in accordance with an exemplary embodiment.

FIG. 2 is a rear perspective view of the pluggable module 106 in accordance with an exemplary embodiment. The pluggable module 106 has a pluggable body 180, which may be defined by one or more shells. The pluggable body 180 includes a top 190, a bottom 192, a first side 194 and a second side 196. In an exemplary embodiment, the pluggable module 106 includes an orientation feature 198 used to orient the pluggable module 106 within the receptacle cage 110 (shown in FIG. 1). In the illustrated embodiment, the orientation feature 198 is a slot 199 formed in the top 190 of the pluggable body 180. The slot 199 extends lengthwise (for example, front to rear). The orientation feature 198 is spaced apart from the first side 194 and spaced apart from the second side 196. The orientation feature 198 may be offset, such as closer to the second side 196.

The pluggable body 180 may be thermally conductive and/or may be electrically conductive, such as to provide EMI shielding for the pluggable module 106. The pluggable body 180 includes a mating end 182 and an opposite front end 184. The front end 184 may be a cable end having a cable extending therefrom to another component within the system. The mating end 182 is configured to be inserted into the corresponding module channel 116 or 118 (shown in FIG. 1). The slot 199 may be open at the mating end 182 to receive the complementary orientation feature of the receptacle assembly 104.

The pluggable module 106 includes a module circuit board 188 that is configured to be communicatively coupled to the communication connector 112 (shown in FIG. 1). The module circuit board 188 may be accessible at the mating end 182. The module circuit board 188 may include components, circuits and the like used for operating and/or using the pluggable module 106. For example, the module circuit board 188 may have conductors, traces, pads, electronics, sensors, controllers, switches, inputs, outputs, and the like associated with the module circuit board 188, which may be mounted to the module circuit board 188, to form various circuits.

In an exemplary embodiment, the pluggable body 180 provides heat transfer for the module circuit board 188, such as for the electronic components on the module circuit board 188. For example, the module circuit board 188 is in thermal communication with the pluggable body 180 and the pluggable body 180 transfers heat from the module circuit board 188. In an exemplary embodiment, the pluggable body 180 includes a thermal interface along the top for interface with the thermal transport assembly 200 (shown in FIG. 1).

Figure 3:
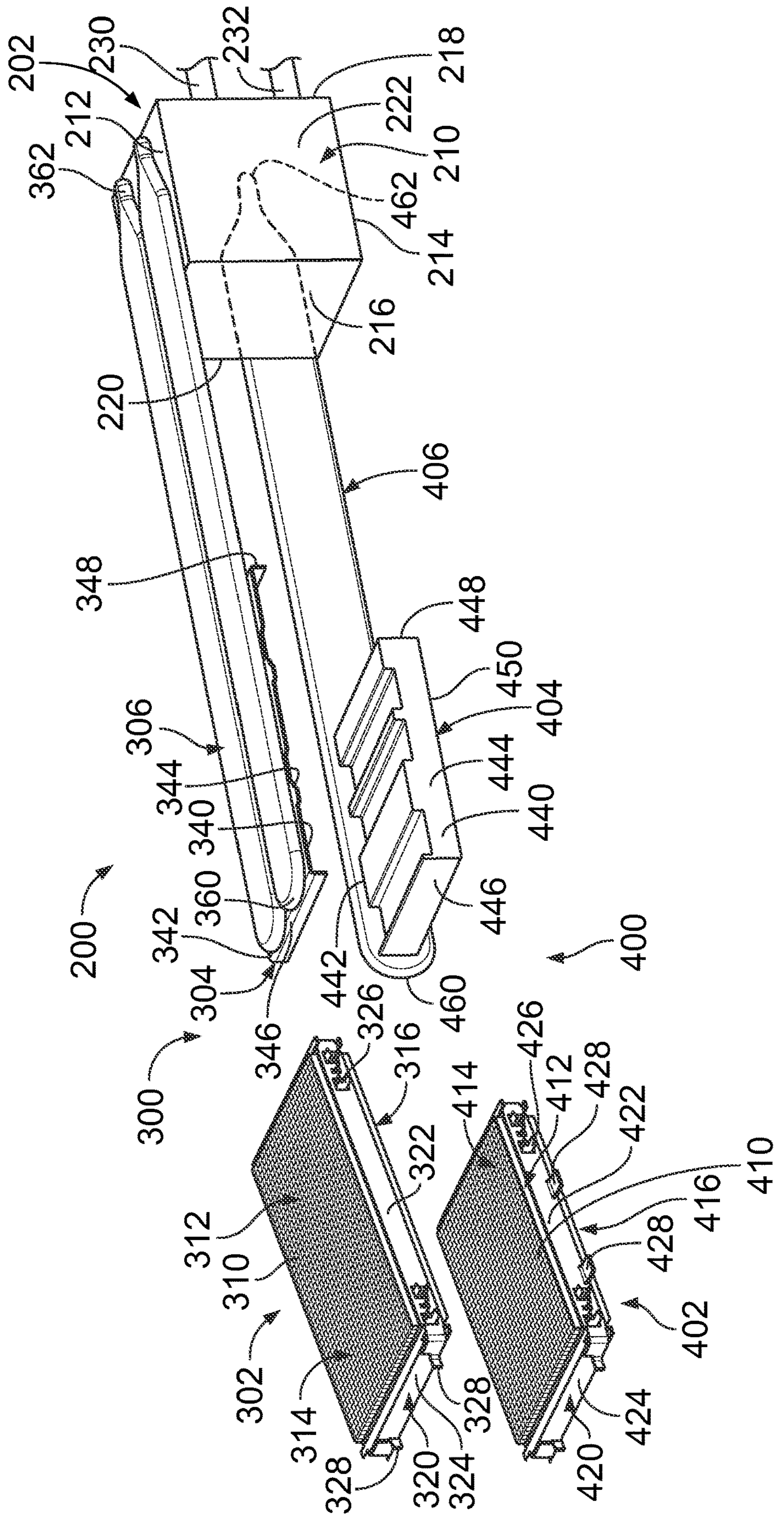
FIG. 3 is an exploded view of the thermal transport assembly in accordance with an exemplary embodiment.

FIG. 3 is an exploded view of the thermal transport assembly 200 in accordance with an exemplary embodiment. The thermal transport assembly 200 includes a first cooling module 300 and a second cooling module 400. In various embodiments, the thermal transport assembly 200 includes an external heat dissipation device 202 located at an exterior of the receptacle cage 110. The external heat dissipation device 202 removes heat from the system from the exterior of the receptacle cage 110. In the illustrated embodiment, the heat dissipation device 202 includes a cold plate 210, which may be liquid cooled. A portion of the cold plate 210 is illustrated. The cold plate 210 may be a portion of a larger cold plate used to cool other components. The cold plate 210 may include an adapter connecting to another cold plate or other cooling structure. Other types of heat dissipation devices may be used in alternative embodiments, such as heat sinks.

The first cooling module 300 is used for cooling the upper pluggable module 106 (FIG. 2) received in the upper module channel 116 (FIG. 1). Thus, the first cooling module 300 may be referred to hereinafter as an upper cooling module 300 and corresponding components may be referenced using the term "upper". The lower cooling module 400 is used for cooling the lower pluggable module 106 (FIG. 2) received in the lower module channel 118 (FIG. 1). Thus, the second cooling module 300 may be referred to hereinafter as a lower cooling module 300 and corresponding components may be referenced using the term "lower".

In an exemplary embodiment, some of the components of the upper cooling module 300 and some of the components of the lower cooling module 400 are configured to be located within the interior cavity 144 of the receptacle cage 110 (FIG. 1), while some of the components of the upper cooling module 300 and some of the components of the lower cooling module 400 are configured to be located along the exterior of the receptacle cage 110. In an exemplary embodiment, some of the components of the upper cooling module 300 and some of the components of the lower cooling module 400 are configured to be fixed relative to the receptacle cage 110, while some of the components of the upper cooling module 300 and some of the components of the lower cooling module 400 are removably coupled to the fixed components to allow ease of assembly.

The cold plate 210 is thermally conductive. For example, the cold plate 210 may be manufactured from a metal material, such as aluminum or copper. In the illustrated embodiment, the cold plate 210 is block shaped having a top 212, a bottom 214, a front 216, a rear 218, a first side 220, and a second side 222. However, the cold plate 210 may have other shapes in alternative embodiments.

In an exemplary embodiment, the cold plate 210 is configured to be liquid cooled by a coolant for efficient heat dissipation. The cold plate 210 is located at the rear of the thermal transport assembly 200 and is configured to be located rearward of the receptacle cage 110 (FIG. 1). However, other locations are possible in alternative embodiments, such as along the top of the receptacle cage 110. The cold plate 210 may include internal cooling tubes or channels to allow liquid coolant to flow through the cold plate 210. A coolant supply 230 is coupled to the cold plate 210. A coolant return 232 is coupled to the cold plate 210. Coolant flows from the coolant supply 230, through the cold plate 210, to the coolant return 232.

In the illustrated embodiment, the upper cooling module 300 includes an upper thermal bridge 302, an upper heat spreader 304, and an upper heat pipe 306. The upper cooling module 300 may include greater or fewer components in alternative embodiments. For example, the cold plate 210 may be directly thermally coupled to the upper thermal bridge 302 rather than having the intervening upper heat spreader 304 and upper heat pipe 306. The upper thermal bridge 302 is configured to be thermally coupled to the upper pluggable module 106. The upper heat spreader 304 is configured to be thermally coupled to the upper thermal bridge 302. The upper heat pipe 306 is configured to thermally couple the upper heat spreader 304 and the cold plate 210.

The upper thermal bridge 302 includes a plurality of first plates 310 arranged in a first plate stack or upper plate stack 312. The first plates 310 are movable relative to each other. For example, the first plates 310 may slide up and down relative to each other. The upper plate stack 312 has an upper interface 314 and a lower interface 316. The interfaces 314, 316 have large surface areas for efficient heat transfer between the upper pluggable module 106 and the upper heat spreader 304. The interfaces 314, 316 are conformable, such as for conforming to the exterior shape of the pluggable module 106 and the exterior shape of the upper heat spreader 304. For example, the first plates 310 along the upper interface 314 may be compressed inward or downward during mating with the upper heat spreader 304 and the first plates 310 along the lower interface 316 may be compressed inward or upward during mating with the upper pluggable module 106. The upper thermal bridge 302 has large surface areas along the upper and lower interfaces 314, 316 to efficiently transfer heat between the pluggable module 106 and the upper heat spreader 304.

The first plates 310 are held together by a frame 320 including frame side walls 322 and frame end walls 324. The walls of the frame 320 may be stamped and formed elements. In an exemplary embodiment, biasing members 326, such as spring elements, extend through the interior of the upper plate stack 312. The biasing members 326 may be coupled to the frame 320, such as the frame side walls 322, and pass through the interior of the upper thermal bridge 302, such as between various first plates 310. The biasing members 326 engage the first plates 310 and press the first plates 310 outward by spring forces. For example, the biasing members 326 may press some of the first plates 310 upward and may press some of the first plates 310 downward thus spreading the various first plates 310 apart. The frame 320 confines the first plates 310 to restrict the first plates 310 from spreading too far apart. The outward spring forces of the biasing members 326 may be overcome during mating to compress the upper and/or lower interface 314, 316. For example, the height of the upper plate stack 312 may change when mated to the upper pluggable module 106 (for example, the upper plate stack 312 may be compressed between the upper heat spreader 304 and the upper pluggable module 106). In an exemplary embodiment, the frame 320 includes mounting tabs 328 that are used to mount the upper thermal bridge 302 to the receptacle cage 110. For example, the mounting tabs 328 may secure the frame 320 relative to the receptacle cage 110 while still allowing the first plates 310 to move relative to the frame 320, such as to compress during mating with the upper pluggable module 106. The frame may be fixed relative to the receptacle cage 110 or may be allowed to float relative to the receptacle cage 110.

The upper heat spreader 304 includes a main body 340 having sides 342, 344 extending between a front 346 and a rear 348. In various embodiments, the main body 340 may be a plate having a relatively narrow thickness. In an exemplary embodiment, the main body 340 is stamped and formed from a sheet of metal. A bottom of the main body 340 is configured to be thermally coupled to the upper interface 314 of the upper thermal bridge 302. The bottom of the main body 340 may directly engage the first plates 310 of the upper thermal bridge 302 for direct thermal transfer between the upper thermal bridge 302 and the upper heat spreader 304. In other embodiments, a thermal grease may be applied to the upper interface 314 of the upper thermal bridge 302 and/or the bottom of the main body 340 to create a thermal interface material layer between the upper thermal bridge 302 and the upper heat spreader 304 and enhance heat transfer at the interface between the upper thermal bridge 302 and the upper heat spreader 304. The upper heat spreader 304 efficiently removes heat from the upper thermal bridge 302.

In an exemplary embodiment, the upper cooling module 300 includes a plurality of the upper heat pipes 306. However, a single upper heat pipe 306 may be used in alternative embodiments. The upper heat pipe 306 extends between the upper heat spreader 304 and the cold plate 210. The upper heat pipe 306 is manufactured from a thermally conductive material, such as aluminum or copper. In various embodiments, the upper heat pipe 306 may be a solid piece. Alternatively, the upper heat pipe 306 may be hollow. The upper heat pipe 306 extends between a front end 360 and a rear end 362. The front end 360 is coupled to the upper heat spreader 304. The rear end 362 is coupled to the cold plate 210. Optionally, the upper heat pipe 306 may be soldered, welded, or connected by thermal epoxy to the cold plate 210 and/or the upper heat spreader 304. The upper heat pipe 306 efficiently transfers heat from the upper heat spreader 304 to the cold plate 210.

In the illustrated embodiment, the lower cooling module 400 includes a lower thermal bridge 402, a lower heat spreader 404, and a lower heat pipe 406. The lower cooling module 400 may include greater or fewer components in alternative embodiments. For example, the cold plate 210 may be directly thermally coupled to the lower thermal bridge 402 rather than having the intervening lower heat spreader 404 and the lower heat pipe 406. The lower thermal bridge 402 is configured to be thermally coupled to the lower pluggable module 106. The lower heat spreader 404 is configured to be thermally coupled to the lower thermal bridge 402. The lower heat pipe 406 is configured to thermally couple the lower heat spreader 404 and the cold plate 210.

The lower thermal bridge 402 includes a plurality of second plates 410 arranged in a second plate stack or lower plate stack 412. The second plates 410 are movable relative to each other. For example, the second plates 410 may slide up and down relative to each other. The lower plate stack 412 has an upper interface 414 and a lower interface 416. The interfaces 414, 416 have large surface areas for efficient heat transfer between the lower pluggable module 106 and the lower heat spreader 404. The interfaces 414, 416 are conformable, such as for conforming to the pluggable module 106 and the lower heat spreader 404. For example, the second plates 410 along the upper interface 414 may be compressed inward or downward during mating with the lower heat spreader 404 and the second plates 410 along the lower interface 416 may be compressed inward or upward during mating with the lower pluggable module 106. The lower thermal bridge 402 has large surface areas along the upper and lower interfaces 414, 416 to efficiently transfer heat between the pluggable module 106 and the lower heat spreader 404.

The second plates 410 are held together by a frame 420 including frame side walls 422 and frame end walls 424. The walls of the frame 420 may be stamped and formed elements. In an exemplary embodiment, biasing members 426, such as spring elements, extend through the interior of the lower plate stack 412. The biasing members 426 may be coupled to the frame 420, such as the frame side walls 422, and pass through the interior of the lower thermal bridge 402, such as between various second plates 410. The biasing members 426 engage the second plates 410 and press the second plates 410 outward by spring forces. For example, the biasing members 426 may press some of the second plates 410 upward and may press some of the second plates 410 downward thus spreading the various second plates 410 apart. The frame 420 confines the second plates 410 to restrict the second plates 410 from spreading too far apart. The outward spring forces of the biasing members 426 may be overcome during mating to compress the upper and/or lower interface 414, 416. For example, the height of the lower plate stack 412 may change when mated to the lower pluggable module 106 (for example, the lower plate stack 412 may be compressed between the lower heat spreader 404 and the lower pluggable module 106). In an exemplary embodiment, the frame 420 includes mounting tabs 428 that are used to mount the lower thermal bridge 402 to the receptacle cage 110. For example, the mounting tabs 428 may secure the frame 420 relative to the receptacle cage 110 while still allowing the second plates 410 to move relative to the frame 420, such as to compress during mating with the lower pluggable module 106. The frame 420 may be fixed relative to the receptacle cage 110 or may be allowed to float relative to the receptacle cage 110.

The lower heat spreader 404 includes a main body 440 having sides 442, 444 extending between a front 446 and a rear 448. In various embodiments, the main body 440 may be a plate or block sized to fit in the separator chamber 158 (FIG. 1). In an exemplary embodiment, the main body 440 is die cast or milled from a metal material. A bottom 450 of the main body 440 is configured to be thermally coupled to the upper interface 414 of the lower thermal bridge 402. The bottom 450 of the main body 440 may directly engage the second plates 410 of the lower thermal bridge 402 for direct thermal transfer between the lower thermal bridge 402 and the lower heat spreader 404. In other embodiments, a thermal grease may be applied to the upper interface 414 of the lower thermal bridge 402 and/or the bottom 450 of the main body 440 to create a thermal interface material layer between the lower thermal bridge 402 and the lower heat spreader 404 and enhance heat transfer at the interface between the lower thermal bridge 402 and the lower heat spreader 404. The lower heat spreader 404 efficiently removes heat from the lower thermal bridge 402.

In an exemplary embodiment, the lower cooling module 400 includes a single lower heat pipe 406. However, multiple lower heat pipes 406 may be used in alternative embodiments. The lower heat pipe 406 extends between the lower heat spreader 404 and the cold plate 210. The lower heat pipe 406 is manufactured from a thermally conductive material, such as aluminum or copper. In various embodiments, the lower heat pipe 406 may be a solid piece. Alternatively, the lower heat pipe 406 may be hollow. The lower heat pipe 406 extends between a front end 460 and a rear end 462. The front end 460 is coupled to the lower heat spreader 404. The rear end 462 is coupled to the cold plate 210. Optionally, the lower heat pipe 406 may be soldered, welded, or connected by thermal epoxy to the cold plate 210 and/or the lower heat spreader 404. The lower heat pipe 406 efficiently transfers heat from the lower heat spreader 404 to the cold plate 210.

Figure 4:
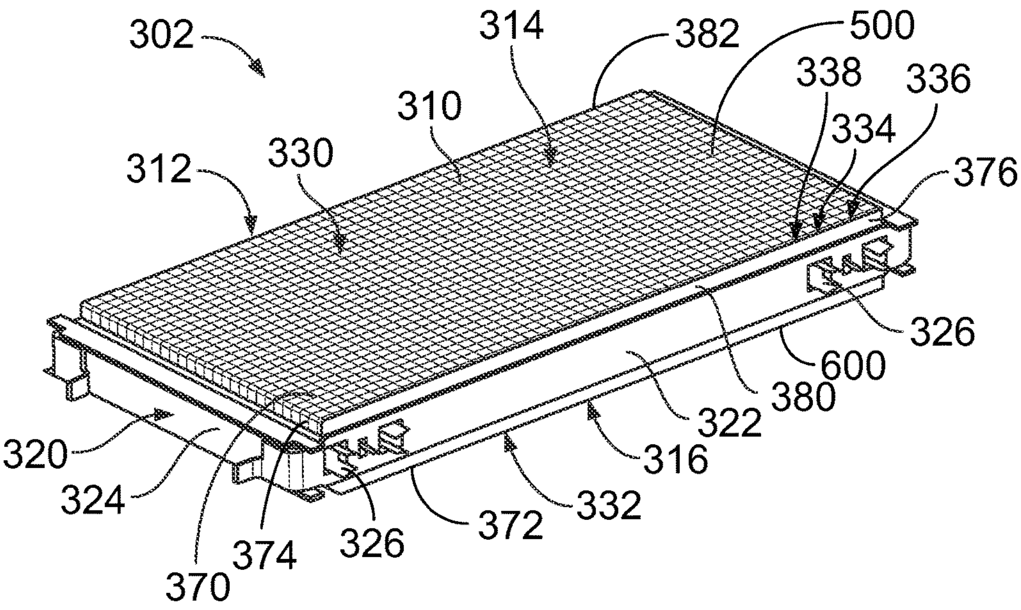
FIG. 4 is a top perspective view of the thermal bridge in accordance with an exemplary embodiment.
Figure 5:
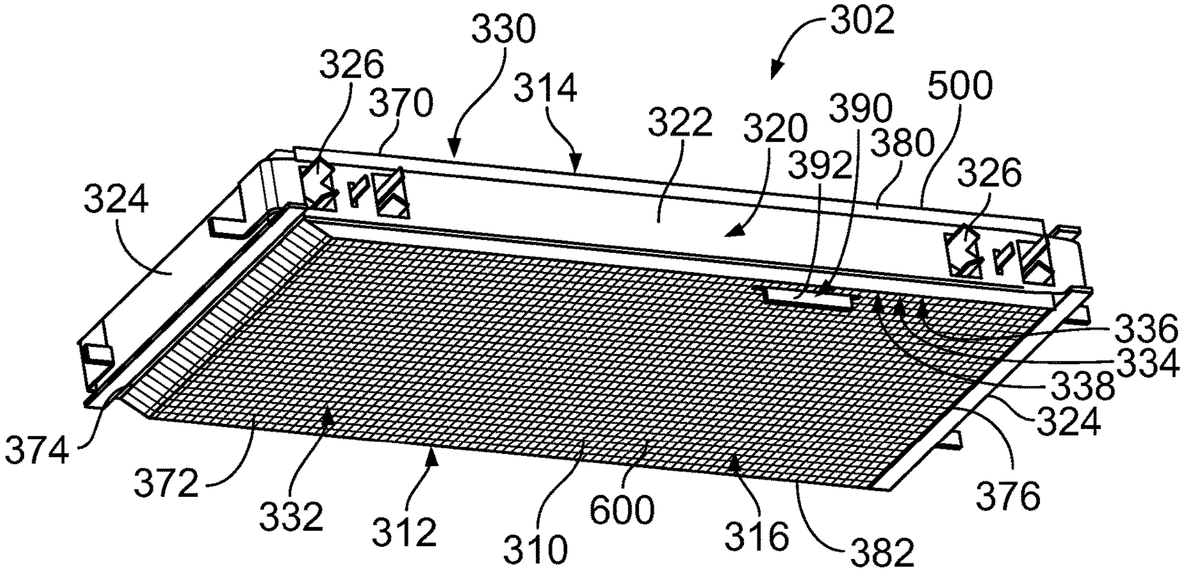
FIG. 5 is a bottom perspective view of the thermal bridge in accordance with an exemplary embodiment.

FIG. 4 is a top perspective view of the thermal bridge 302 in accordance with an exemplary embodiment. FIG. 5 is a bottom perspective view of the thermal bridge 302 in accordance with an exemplary embodiment. The upper thermal bridge 302 is similar to the lower thermal bridge 402 (FIG. 3) and the lower thermal bridge 402 may include similar components.

The thermal bridge 302 includes the first plates 310 arranged in the plate stack 312. The frame side walls 322 and the frame end walls 324 surround the plate stack 312 and hold the first plates 310 in the plate stack 312. The biasing members 326 are located between the first plates 310 and used to spread the first plates 310 apart to form a compressible thermal device that may be compressed between the heat spreader 304 and the pluggable module 106. The biasing members 326 are coupled to the frame side walls 322 and pass through the interior of the thermal bridge 302.

In an exemplary embodiment, the thermal bridge 302 includes an upper bridge assembly 330 and a lower bridge assembly 332. The biasing members 326 are located between the upper and lower bridge assemblies 330, 332. The frame 320 is configured to hold the upper and lower bridge assemblies 330, 332. In an exemplary embodiment, the biasing members 326 are spring elements, such as multi-piece spring elements. The spring element pieces cooperate to form the biasing members 326.

In an exemplary embodiment, the thermal bridge 302 is parallelepiped (for example, generally box shaped). For example, the thermal bridge 302 includes a top 370, a bottom 372, a front 374, a rear 376, a first side 380, and a second side 382. The top 370 may be generally planar and defines the upper interface 314. The bottom 372 may be generally planar and forms the lower interface 316. The front 374 may be generally planar. The rear 376 may be generally planar. The first side 380 may be generally planar. The second side 382 may be generally planar. However, the thermal bridge 302 may have other shapes in alternative embodiments. The structure used to hold the thermal bridge 302 together is defined by the frame 320. In an exemplary embodiment, the bridge frame 320 extends along the sides 380, 382, the front 374 and the rear 376 and generally avoids the top 370 and the bottom 372 to allow for large amounts of usable external surface area for thermal connection with the heat spreader 304 and the pluggable module 106.

In an exemplary embodiment, the bridge assemblies 330, 332 each include a plurality of the plates 310 that are arranged together in the plate stack 312. The plates 310 are interleaved with each other for thermal communication between the upper bridge assembly 330 and the lower bridge assembly 332. The individual plates 310 are movable relative to each other such that the plates 310 may be individually articulated to conform to the exterior shape of the heat spreader 304 and/or the exterior shape of the pluggable module 106. For example, the individual plates 310 may conform for improved contact with the heat spreader 304 and/or the pluggable module 106. A gap or space may be provided between the plates 310 of the upper and lower bridge assemblies 330, 332 to receive the biasing members 326 between the bridge assemblies 330, 332.

In an exemplary embodiment, the plates 310 includes upper plates 500 and lower plates 600 of the upper bridge assembly 330 and the lower bridge assembly 332, respectively. In an exemplary embodiment, the upper and lower plates 500, 600 are arranged in plate pairs 334, 336, 338. Each plate pair 334, 336, 338 includes one of the upper plates 500 and one of the lower plates 600. The plates 500, 600 in the plate pairs 334, 336, 338 are aligned with each other. For example, the upper and lower plates 500, 600 are vertically stacked with the upper plate 500 above the lower plate 600. The plate pairs 334, 336, 338 are stacked together to form the thermal bridge 302 in the stacked arrangement. The frame 320 holds the plate pairs 334, 336, 338 in the stacked arrangement. The biasing members 326 are configured to be positioned between the upper and lower plates 500, 600 and spread the upper plates 500 apart from the lower plates 600.

In an exemplary embodiment, at least one of the lower plates 600 includes an orientation feature 390 used to orient the pluggable module 106 within the receptacle cage 110 (shown in FIG. 1). In the illustrated embodiment, the orientation feature 390 is an orientation tab 392 at the bottom 372 of the thermal bridge 302. The orientation tab 392 extends downward from the bottom 372, such as below the plane defined by the lower interface 316. The orientation tab 392 extends lengthwise (for example, front to rear). The orientation tab 392 is spaced apart from the first side 380 and spaced apart from the second side 382. The orientation tab 392 may be offset, such as closer to the second side 382. The orientation tab 392 is configured to be received in the slot 199 (FIG. 2) in the pluggable module 106. The orientation tab 392 blocks improper loading of the pluggable module 106 into the receptacle cage 110.

Figure 6:
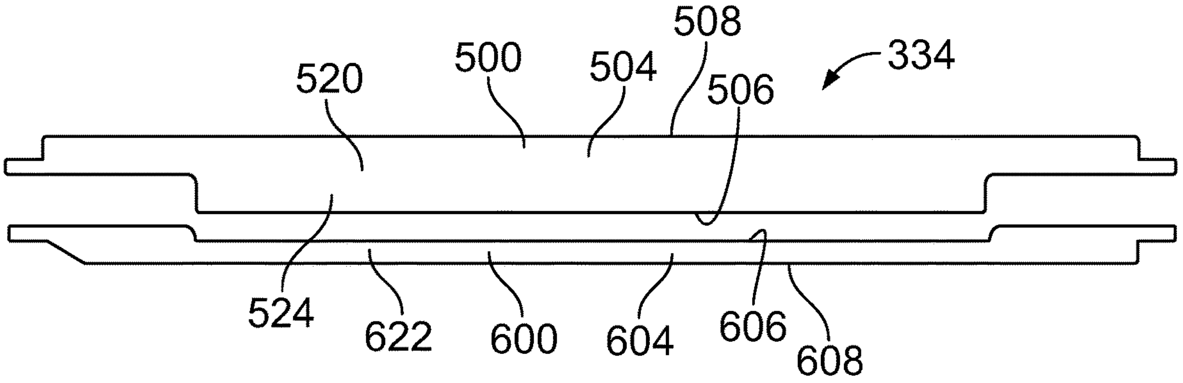
FIG. 6 illustrates a first plate pair in accordance with an exemplary embodiment showing an upper plate and a lower plate arranged relative to each other.
Figure 7:
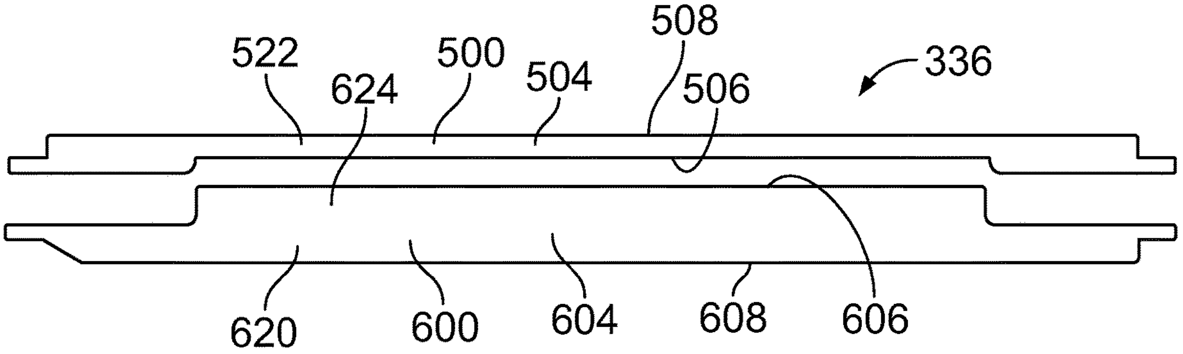
FIG. 7 illustrates a second plate pair in accordance with an exemplary embodiment showing an upper plate and a lower plate arranged relative to each other.
Figure 8:
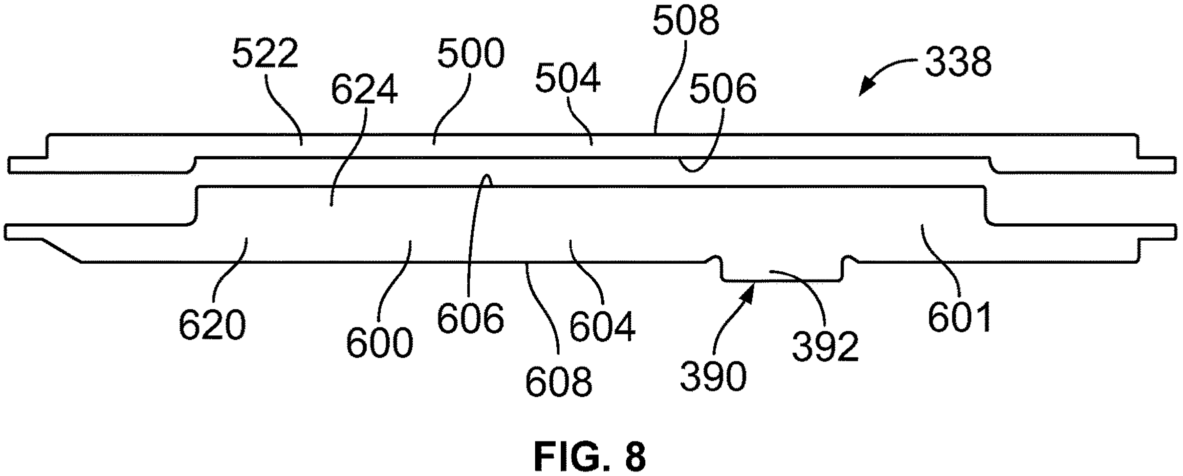
FIG. 8 illustrates a third plate pair in accordance with an exemplary embodiment showing an upper plate and a lower plate arranged relative to each other.

FIG. 6 illustrates a first plate pair 334 in accordance with an exemplary embodiment showing an upper plate 500 and a lower plate 600 arranged relative to each other. FIG. 7 illustrates a second plate pair 334 in accordance with an exemplary embodiment showing an upper plate 500 and a lower plate 600 arranged relative to each other. FIG. 8 illustrates a third plate pair 334 in accordance with an exemplary embodiment showing an upper plate 500 and a lower plate 600 arranged relative to each other.

In an exemplary embodiment, each upper plate 500 has sides 504 extending between an inner end 506 and an outer end 508 of the upper plate 500. The inner end 506 (bottom) faces the lower plate 600. The outer end 508 (top) faces outward, such as toward the heat spreader 304 (FIG. 3). The upper plates 500 of the different plate pairs 334, 336 and/or 338 have different shapes, such as different heights and/or different features between the inner end 506 and the outer end 508. In the illustrated embodiment, the upper plates 500 of the second and third plate pairs 336, 338 are identical but are different than the upper plates 500 of the first plate pair 334.

In an exemplary embodiment, each lower plate 600 has sides 604 extending between an inner end 606 and an outer end 608 of the lower plate 600. The inner end 606 (top) faces the upper plate 500. The outer end 608 (bottom) faces outward, such as toward the pluggable module 106 (FIG. 2). The lower plates 600 of the different plate pairs 334, 336 and/or 338 have different shapes, such as different heights and/or different features between the inner end 606 and the outer end 608. In an exemplary embodiment, the lower plate 600 of the third plate pair 338 (FIG. 8) is an orientation plate 601 having the orientation feature 390 at the outer end 608. The orientation tab 392 is integral with the orientation plate 601 and protrudes downward from the outer end 608 (bottom).

In an exemplary embodiment, the upper plates 500 include upper bridge plates 520 (FIG. 6) and upper spacer plates 522 (FIGS. 7 and 8). The upper spacer plates 522 are configured to be located between the upper bridge plates 520 in the plate stack. The upper bridge plates 520 have a bridge section 524 at a central portion. The bridge section 524 is wider (for example, taller) than the central section of the upper spacer plate 522. The bridge section 524 is configured to overlap complimentary bridge sections of the adjacent lower plates 600 for thermal transfer between the upper and lower plates 500, 600.

In an exemplary embodiment, the lower plates 600 include lower bridge plates 620 (FIGS. 7 and 8) and lower spacer plates 622 (FIG. 6). The lower spacer plates 622 are configured to be located between the lower bridge plates 620 in the plate stack. The lower bridge plates 620 have a bridge section 624 at a central portion. The bridge section 624 is wider (for example, taller) than the central section of the lower spacer plate 622. The bridge section 624 is configured to overlap complimentary bridge sections 524 of the adjacent upper plates 500 for thermal transfer between the upper and lower plates 500, 600.

Figure 9:
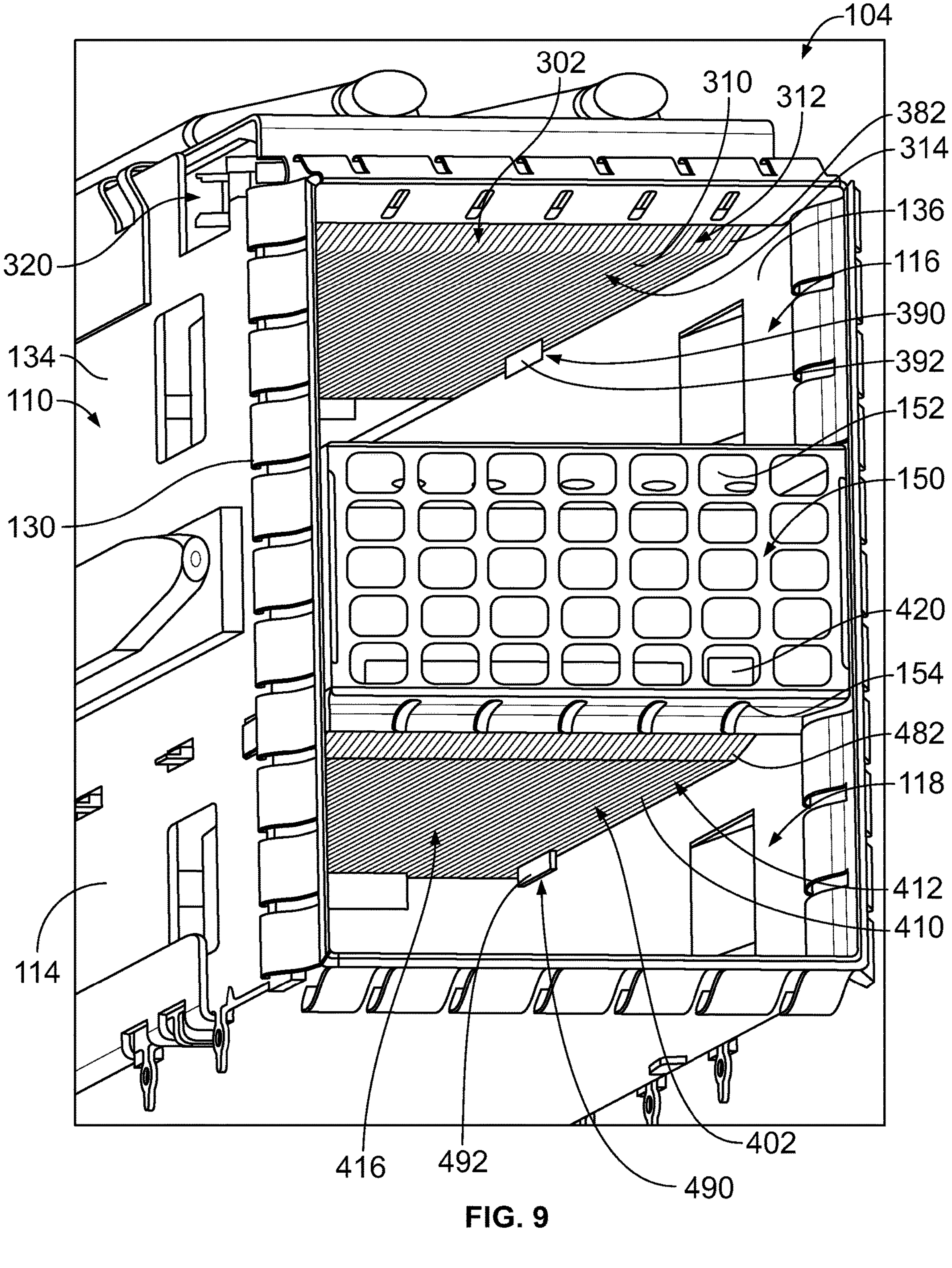
FIG. 9 is a front perspective view of a portion of the receptacle assembly in accordance with an exemplary embodiment.
Figure 10:
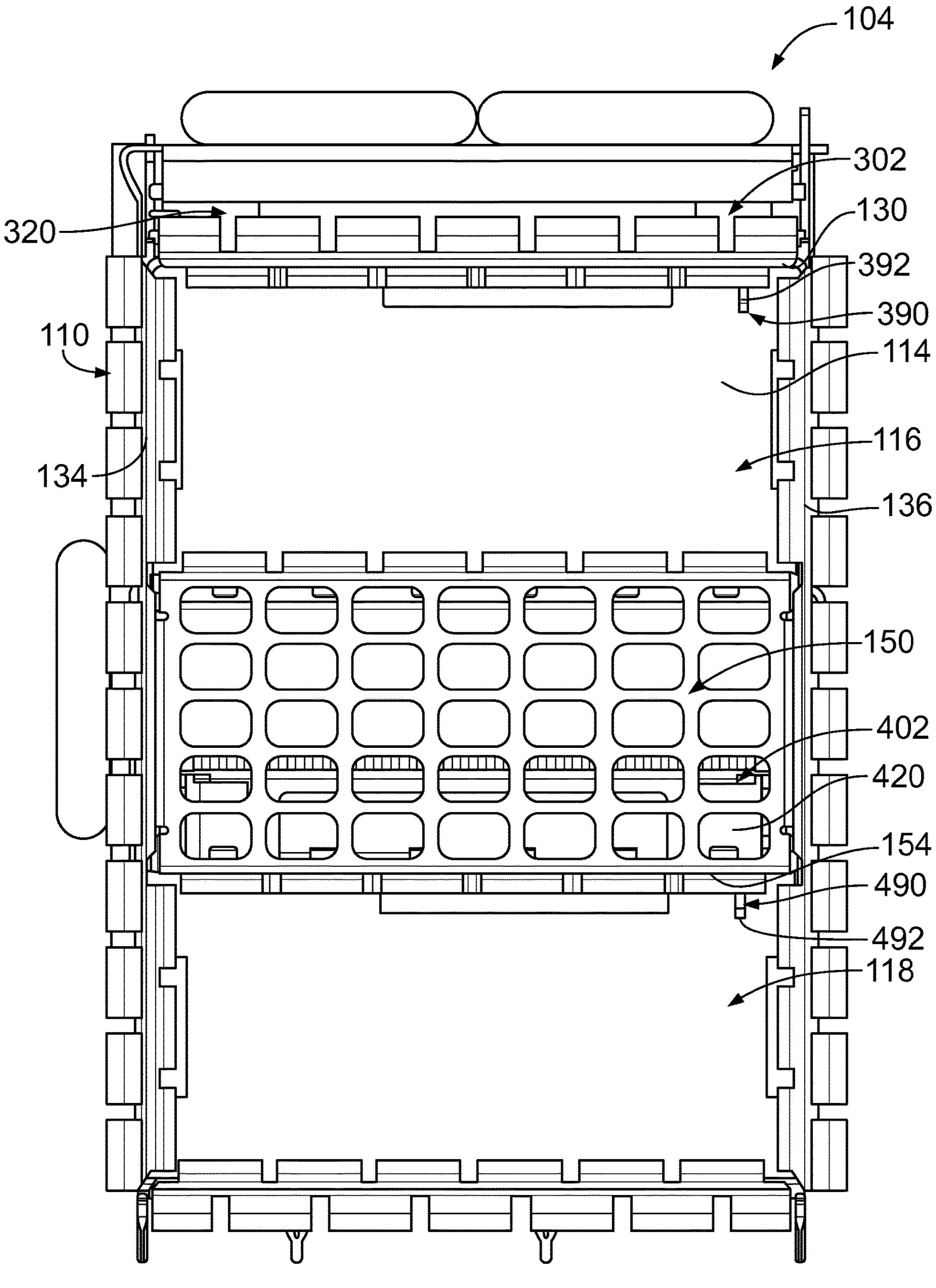
FIG. 10 is a front view of the receptacle assembly in accordance with an exemplary embodiment.
Figure 11:
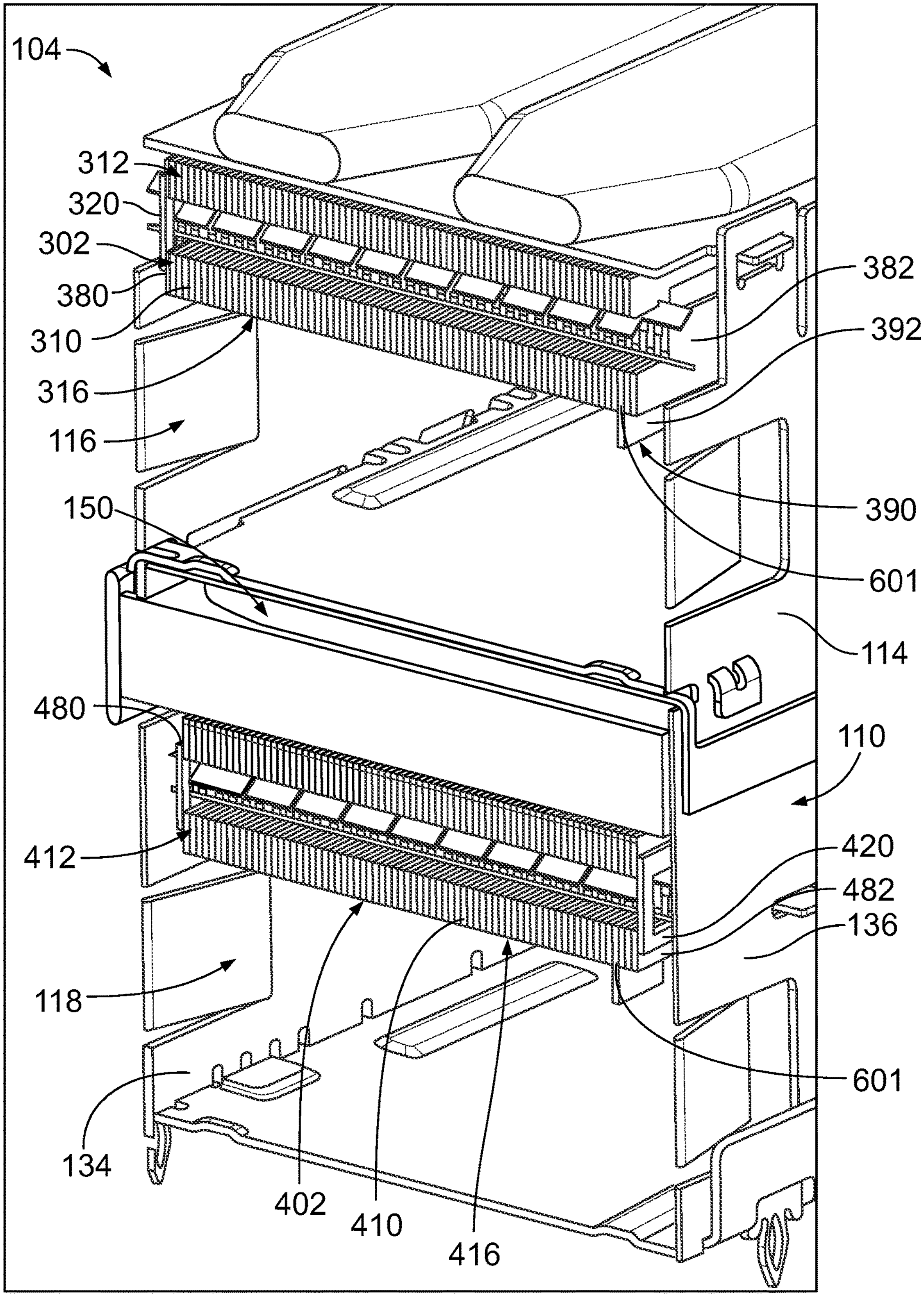
FIG. 11 is a front perspective, partial sectional view of a portion of the receptacle assembly in accordance with an exemplary embodiment.

FIG. 9 is a front perspective view of a portion of the receptacle assembly 104 in accordance with an exemplary embodiment. FIG. 10 is a front view of the receptacle assembly 104 in accordance with an exemplary embodiment. FIG. 11 is a front perspective, partial sectional view of a portion of the receptacle assembly 104 in accordance with an exemplary embodiment. FIGS. 9-11 illustrate orientation features 390, 490 of the upper and lower thermal bridges 302, 402, respectively. The orientation features 390, 490 are used for keyed mating The thermal bridges 302, 402 include the thermal interfaces 316, 416 at the bottoms of the thermal bridges 302, 402 configured to interface with the pluggable modules 106 and remove heat from the pluggable modules 106 when the pluggable modules 106 are plugged into the module channels 116, 118. The thermal bridges 302, 402 include the orientation tabs 392, 492 extending from the interfaces 316, 416 at the bottoms of the thermal bridges 302, 402. The orientation tabs 392, 492 define keying features for keyed mating with the pluggable modules 106 to orient the pluggable modules 106 in the module channels 116, 118.

In an exemplary embodiment, the orientation tabs 392, 492 are spaced apart from the receptacle cage 110. For example, the orientation tabs 392, 492 are spaced apart from the first side wall 134 and spaced apart from the second side wall 136 of the receptacle cage 110. The receptacle cage 110 does not include the orientation tabs 392, 492. Rather, the orientation tabs 392, 492 are parts of the thermal bridges 302, 402. For example, the orientation tabs 392, 492 are integral with the plates 310, 410 of the thermal bridges 302, 402.

In an exemplary embodiment, the orientation tab 392 are spaced apart from the sides 380, 382 of the thermal bridge 302 and the orientation tab 492 are spaced apart from sides 480, 482 of the thermal bridge 402. The thermal bridge 302 is located on both sides of the orientation tab 392 and the thermal bridge 402 is located on both sides of the orientation tab 492. For example, plates 310 are located on both sides of the orientation tab 392 and plates 410 are located on both sides of the orientation tab 492.

In an exemplary embodiment, the thermal bridge 302 has a thermal bridge width between the first side 380 and the second side 382 and the thermal bridge 402 has a thermal bridge width between the first side 480 and the second side 482. The cavity 144 has a cavity width between the first side wall 134 and the second side wall 136. In an exemplary embodiment, the thermal bridge width is approximately equal to the cavity width. For example, no portion of the top wall 130 extends inward from the side walls 134, 136 in the area of the thermal bridge 302. Rather, the top opening in the top wall 130 extends entirely across the width of the receptacle cage 110 allowing for a large surface area of the thermal bridge 302 for interfacing with the pluggable module 106. Because the cage walls 114 are not located directly above the pluggable module 106, the orientation feature 390 is provided on the thermal bridge 302 rather than extending from any of the cage walls 114. Similarly, no portion of the separator wall 154 extends inward from the side walls 134, 136 in the area of the thermal bridge 402. Rather, the lower opening in the lower separator wall 154 extends entirely across the width of the receptacle cage 110 allowing for a large surface area of the thermal bridge 402 for interfacing with the pluggable module 106. Because the cage walls 114 and port separator 150 are not located directly above the pluggable module 106, the orientation feature 490 is provided on the thermal bridge 402 rather than extending from any of the cage walls 114 or the port separator 150.

In an exemplary embodiment, the plates 310 in the plate stack 312 are movable relative to each other and the plates 410 in the plate stack 412 are movable relative to each other. For example, the thermal bridges 302, 402 are compressible. The orientation tabs 392, 492 are compressible with the thermal bridge 302, 402. In an exemplary embodiment, the orientation plates 601 of the plate stacks 312, 412 are movable relative to the other plates. As such, the orientation tabs 392, 492 are movable relative to other plates 310, 410 in the plate stacks 312, 412. The frames 320, 420 generally hold the plates 310, 410 in the plate stacks 312, 412, respectively, and are connected to the cage walls 114. The orientation tabs 392, 492 are movable relative to the frames 320, 420, and thus movable relative to the cage walls 114 of the receptacle cage 110. The orientation tabs 392, 492 of the thermal bridge 302, 402 are configured to directly interface with the orientation features 198 (for example, slots 199) in the pluggable modules 106 to orient the pluggable modules 106 in the module channels 116, 118.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A receptacle assembly comprising:

a receptacle cage including cage walls forming a cavity, the cage walls including a top wall, a first side wall, and a second side wall, the receptacle cage extending between a front and a rear, the cavity including a module channel configured to receive a pluggable module; and a thermal transport assembly coupled to the receptacle cage, the thermal transport assembly including a thermal bridge being received in the cavity, the thermal bridge including a thermal interface at a bottom of the thermal bridge configured to interface with the pluggable module and remove heat from the pluggable module, the thermal bridge including an orientation tab extending from the bottom, the orientation tab including a mating interface for interfacing with the pluggable module, the orientation tab defining a keying feature for keyed mating with the pluggable module to orient the pluggable module in the module channel.

2. The receptacle assembly of claim 1, wherein the orientation tab is spaced apart from the first side wall and spaced apart from the second side wall.

3. The receptacle assembly of claim 1, wherein the thermal bridge includes a first side and a second side extending between a front and a rear of the thermal bridge, the orientation tab being spaced apart from the first side and being spaced apart from the second side.

4. The receptacle assembly of claim 3, wherein the thermal bridge has a thermal bridge width between the first side and the second side, the cavity having a cavity width between the first side wall and the second side wall, the thermal bridge width being approximately equal to the cavity width.

5. The receptacle assembly of claim 1, wherein the thermal bridge is compressible, the orientation tab being compressible with the thermal bridge.

6. The receptacle assembly of claim 1, wherein the thermal bridge includes a frame coupled to the receptacle cage, the orientation tab being movable relative to the frame and being movable relative to the receptacle cage.

7. The receptacle assembly of claim 1, wherein the thermal bridge includes plates arranged in a plate stack, the plates being movable relative to each other, the plates including an orientation plate, the orientation plate including the orientation tab extending from a bottom of the orientation plate.

8. The receptacle assembly of claim 1, wherein the thermal bridge is a first thermal bridge, the thermal transport assembly further comprising a second thermal bridge, the module channel being an upper module channel, the cavity further comprising a lower module channel, the first thermal bridge extending into the upper module channel to interface with the pluggable module received in the upper module channel, the second thermal bridge extending into the lower module channel to interface with a second pluggable module receive in the lower module channel.

9. The receptacle assembly of claim 1, wherein the thermal transport assembly includes a heat pipe thermally coupled to the thermal bridge to move heat from the thermal bridge to a heat dissipation element.

10. The receptacle assembly of claim 1, wherein the top wall includes a top opening receiving the thermal bridge, the orientation tab being aligned with the top opening.

11. The receptacle assembly of claim 10, wherein the top opening extends an entire width of the receptacle cage between the first side wall and the second side wall.

12. The receptacle assembly of claim 1, wherein the orientation tab of the thermal bridge is configured to directly interface with a slot in the pluggable module to orient the pluggable module in the module channel.

13. The receptacle assembly of claim 1, wherein the receptacle cage does not include the orientation tab.

14. A receptacle assembly comprising:

a receptacle cage including cage walls forming a cavity, the cage walls including a top wall, a first side wall, and a second side wall, the receptacle cage extending between a front and a rear, the receptacle cage including a channel separator received in the cavity between the first and second side walls, the channel separator including an upper separator wall and a lower separator wall with a separator chamber between the upper and lower separator walls, the channel separator separating the cavity into an upper module channel configured to receive an upper pluggable module and a lower module channel configured to receive a lower pluggable module, the top wall including a top opening providing access to the upper module channel, the lower separator wall including a lower opening providing access to the lower module channel; and a thermal transport assembly coupled to the receptacle cage, the thermal transport assembly including a first cooling module and a second cooling module, the first cooling module including a first thermal bridge located in the top opening, the first thermal bridge including a first thermal interface at a bottom of the first thermal bridge configured to interface with the upper pluggable module and remove heat from the upper pluggable module, the first thermal bridge including a first orientation tab extending from the bottom of the first thermal bridge, the first orientation tab including a first mating interface for interfacing with the upper pluggable module, the first orientation tab defining a first keying feature for keyed mating with the upper pluggable module to orient the upper pluggable module in the upper module channel, the second cooling module including a second thermal bridge located in the lower opening, the second thermal bridge including a second thermal interface at a bottom of the second thermal bridge configured to interface with the lower pluggable module and remove heat from the lower pluggable module, the second thermal bridge including a second orientation tab extending from the bottom of the second thermal bridge, the second orientation tab including a second mating interface for interfacing with the lower pluggable module, the second orientation tab defining a second keying feature for keyed mating with the lower pluggable module to orient the lower pluggable module in the lower module channel.

15. The receptacle assembly of claim 14, wherein:

the first cooling module includes the first thermal bridge, a first heat spreader, and a first heat pipe, the first thermal bridge including an upper interface and a lower interface, the lower interface of the first thermal bridge configured to face and thermally couple to the pluggable module, the first heat spreader being thermally coupled to the upper interface of the first thermal bridge, the first heat pipe thermally coupled between the first heat spreader and the cold plate to move heat from the first heat spreader to the cold plate, the first thermal bridge being located in the top opening to interface with the upper pluggable module in the upper module channel; and the second cooling module including the second thermal bridge, a second heat spreader, and a second heat pipe, the second thermal bridge including an upper interface and a lower interface, the lower interface of the second thermal bridge configured to face and thermally couple to the pluggable module, the second heat spreader being thermally coupled to the upper interface of the second thermal bridge, the second heat pipe thermally coupled between the second heat spreader and the cold plate to move heat from the second heat spreader to the cold plate, the second thermal bridge being located in the separator chamber to interface with the second pluggable module in the lower module channel.

16. A thermal bridge for a receptacle assembly configured to remove heat from a pluggable module plugged into the receptacle assembly comprising:

an upper bridge assembly including a plurality of upper plates arranged in an upper plate stack, each upper plate having a front end and a rear end, each upper plate having sides between the front end and the rear end, each upper plate having an inner end and an outer end;

a lower bridge assembly including a plurality of lower plates arranged in a lower plate stack, each lower plate having a front end and a rear end, each lower plate having sides between the front end and the rear end, each lower plate having an inner end and an outer end, the outer ends of the lower plates configured to face and thermally couple to an electrical component, the sides of the lower plates facing the sides of the upper plates to thermally interface the lower plates with the upper plates;

a spring element positioned between the upper bridge assembly and the lower bridge assembly, the spring element including an upper spring member engaging the upper plates to bias the upper plates with an opening force generally away from the lower plates, the spring element including a lower spring member engaging the lower plates to bias the lower plates with an opening force generally away from the upper plates;

wherein the plurality of lower plates includes an orientation plate having an orientation tab extending from the outer end thereof, the orientation tab defining a keying feature for keyed mating with the pluggable module to orient the pluggable module in the receptacle assembly.

17. The thermal bridge of claim 16, wherein the orientation plate is an internal plate including at least one lower plate to a right side of the orientation plate and at least one lower plate to a left side of the orientation plate.

18. The thermal bridge of claim 16, wherein the lower bridge assembly includes a first side and a second side extending between a front and a rear of the lower bridge assembly, the orientation tab being spaced apart from the first side and being spaced apart from the second side.

19. The thermal bridge of claim 16, wherein the spring element is compressible allowing the lower plates to move relative to the upper plates, the orientation tab being movable with the orientation plate relative to the upper plates.

20. The thermal bridge of claim 16, further comprising a frame surrounding the upper plate stack and the lower plate stack, the frame configured to be coupled to the receptacle cage, the orientation tab being movable relative to the frame.

* * * * *